(12) United States Patent
Sasano (10) Patent No.: US 12,151,629 B2
(45) Date of Patent: Nov. 26, 2024

(54) BATTERY INSTALLATION STRUCTURE

(71) Applicant: Honda Motor Co., Ltd., Tokyo (JP)

(72) Inventor: Yamato Sasano, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 417 days.

(21) Appl. No.: 17/684,353

(22) Filed: Mar. 1, 2022

(65) Prior Publication Data

US 2022/0314909 A1    Oct. 6, 2022

(30) Foreign Application Priority Data

Mar. 30, 2021    (CN) .......................... 202110342214.7

(51) Int. Cl.
 *B60R 16/033*    (2006.01)
 *B60R 16/02*    (2006.01)
 *B62D 25/08*    (2006.01)

(52) U.S. Cl.
 CPC ........ *B60R 16/033* (2013.01); *B60R 16/0207* (2013.01); *B62D 25/08* (2013.01)

(58) Field of Classification Search
 CPC ... B60R 16/033; B60R 16/0207; B60R 16/04; B60R 16/03; B60R 16/02; B62D 25/08; B62D 25/082
 See application file for complete search history.

(56) References Cited

U.S. PATENT DOCUMENTS

| | | | | |
|---|---|---|---|---|
| 5,636,701 A * | 6/1997 | Norman | ................. | B60R 16/04 180/68.5 |
| 6,290,013 B1 * | 9/2001 | Bienenstein, Jr. | ... | B62D 25/082 180/69.1 |
| 6,340,538 B1 * | 1/2002 | King | ................... | H01M 50/202 429/96 |
| 6,460,642 B1 * | 10/2002 | Hirano | .................... | B60K 6/40 903/952 |
| 6,564,893 B2 * | 5/2003 | Lipman | .............. | H01M 50/264 180/68.5 |
| 6,626,477 B2 * | 9/2003 | Maynard | ................ | B62D 39/00 340/471 |
| 6,827,168 B2 * | 12/2004 | Miyazaki | ............... | B60R 19/00 180/274 |
| 6,828,755 B1 * | 12/2004 | Iverson | .............. | H01M 10/613 320/104 |

(Continued)

FOREIGN PATENT DOCUMENTS

WO    2016163224    10/2016

*Primary Examiner* — James M Dolak
(74) *Attorney, Agent, or Firm* — JCIPRNET (57) ABSTRACT

A battery installation structure capable of allowing a battery to be obliquely installed on a front side frame while maintaining the stability of the battery is provided. The battery installation structure is suitable for allowing a battery to be obliquely installed on a front side frame of a vehicle body, and the battery installation structure includes an installation base, a receiving groove, and a supporting portion. The installation base is disposed on the front side frame. The receiving groove is disposed in a middle of the installation base to receive a wiring harness connected to the battery. The supporting portion is disposed at a front end and a rear end of the installation base and forms triangular supporting surfaces at a front and rear of the receiving groove to support the battery.

10 Claims, 5 Drawing Sheets

(56) References Cited

U.S. PATENT DOCUMENTS

| | | | | |
|---|---|---|---|---|
| 7,485,983 | B2* | 2/2009 | Asao | H01M 10/625 |
| | | | | 307/151 |
| 7,543,666 | B2* | 6/2009 | Connelly | H01M 50/244 |
| | | | | 180/68.5 |
| 8,820,452 | B2* | 9/2014 | Iwasa | B60L 50/51 |
| | | | | 307/10.6 |
| 8,822,056 | B2* | 9/2014 | Brewer | H01M 50/20 |
| | | | | 429/96 |
| 9,073,498 | B2* | 7/2015 | Lee | B60R 16/04 |
| 9,120,441 | B1* | 9/2015 | Stojkovic | B60R 16/04 |
| 9,168,819 | B2* | 10/2015 | Suzuki | B60K 1/04 |
| 9,409,495 | B2* | 8/2016 | Kobayashi | B60R 16/04 |
| 9,469,201 | B2* | 10/2016 | Hotta | B60L 50/60 |
| 9,640,787 | B2* | 5/2017 | Lee | H01M 50/249 |
| 10,183,637 | B2* | 1/2019 | Uraguchi | H01M 50/202 |
| 10,249,858 | B2* | 4/2019 | Konoura | B60L 50/64 |
| 10,910,616 | B2* | 2/2021 | Choi | H01M 10/425 |
| 2009/0120661 | A1* | 5/2009 | Inoue | B60R 16/0215 |
| | | | | 174/110 SR |

* cited by examiner

BATTERY INSTALLATION STRUCTURE

CROSS-REFERENCE TO RELATED APPLICATION

This application claims the priority benefits of China application no. 202110342214.7, filed on Mar. 30, 2021. The entirety of the above-mentioned patent application is hereby incorporated by reference herein and made a part of this specification.

BACKGROUND

Technical Field

The disclosure relates to a battery installation structure, and in particular, relates to a battery installation structure applied in a vehicle.

Description of Related Art

In the related art, a battery may be mounted in a vehicle. The battery is supported through a battery supporting base provided on a front side frame disposed at a front of a vehicle body and is fixed via a fixing member. For instance, Patent Literature 1 discloses that a battery supporting base is arranged to be orthogonal to a front side frame, and a battery is installed on the battery supporting base, so that the battery is installed on the front side frame in a forward direction. However, in consideration of the influence of the types of engines used in the vehicles on the overall layout, the batteries may not be arranged to be orthogonal to the front side frames in more and more vehicles, and the batteries may only be obliquely installed on the front side frames. Therefore, how to maintain the stability of a battery in a battery installation structure where the battery is installed obliquely on a front side frame is an important issue.

RELATED ART LITERATURE

Patent Literature

[Patent Literature 1] International Patent Publication No. WO2016-163224

SUMMARY

The disclosure provides a battery installation structure capable of allowing a battery to be obliquely installed on a front side frame while maintaining the stability of the battery.

The disclosure provides a battery installation structure suitable for allowing a battery to be obliquely installed on a front side frame of a vehicle body, and the battery installation structure includes an installation base, a receiving groove, and a supporting portion. The installation base is disposed on the front side frame. The receiving groove is disposed in a middle of the installation base to receive a wiring harness connected to the battery. The supporting portion is disposed at a front end and a rear end of the installation base and forms triangular supporting surfaces at a front and rear of the receiving groove to support the battery.

In an embodiment of the disclosure, the receiving groove is configured to gradually widen towards a diverging direction of the wiring harness.

In an embodiment of the disclosure, a front end of the supporting portion coincides with a front end of the front side frame in a front-and-rear direction.

In an embodiment of the disclosure, the supporting surfaces are arranged in a direction opposite to a diverging direction of the wiring harness.

In an embodiment of the disclosure, a length of one side wall of the receiving groove is shorter than a length of another side wall of the receiving groove, and one end of the one side wall is provided with a notch.

In an embodiment of the disclosure, a pair of fixing portions are correspondingly provided on the supporting surface of the supporting portion protruding from the front side frame towards an inner side and on the front side frame.

In an embodiment of the disclosure, a center of gravity of the battery installed on the installation base is arranged on a ridge line of the front side frame in a plan view, and the center of gravity of the battery corresponds to a fixing member connected to the pair of fixing portions in a plan view.

In an embodiment of the disclosure, a reinforcing rib is provided in the receiving groove along a connecting line of the pair of fixing portions.

In an embodiment of the disclosure, an inner side of the receiving groove is provided with an engaging piece for being engaged with the wiring harness.

In an embodiment of the disclosure, a lower member extending from an inner side of the front side frame to the supporting portion is provided below the installation base, and the lower member is provided with reinforcing surfaces supporting the supporting surfaces.

To sum up, in the battery installation structure provided by the disclosure, the installation base is disposed on the front side frame. The receiving groove is disposed in the middle of the installation base to receive the wiring harness connected to the battery. The supporting portion is disposed at the front end and the rear end of the installation base and forms the triangular supporting surfaces at the front and rear of the receiving groove to support the battery. In this way, the battery is supported by the triangular supporting surfaces at the front and rear of the receiving groove. As such, the battery may be obliquely installed on the front side frame of the vehicle body while maintaining the stability, and the flexibility of arrangement of the wiring harness is also improved. Therefore, the battery installation structure provided by the disclosure is capable of allowing the battery to be obliquely installed on the front side frame while maintaining the stability of the battery.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
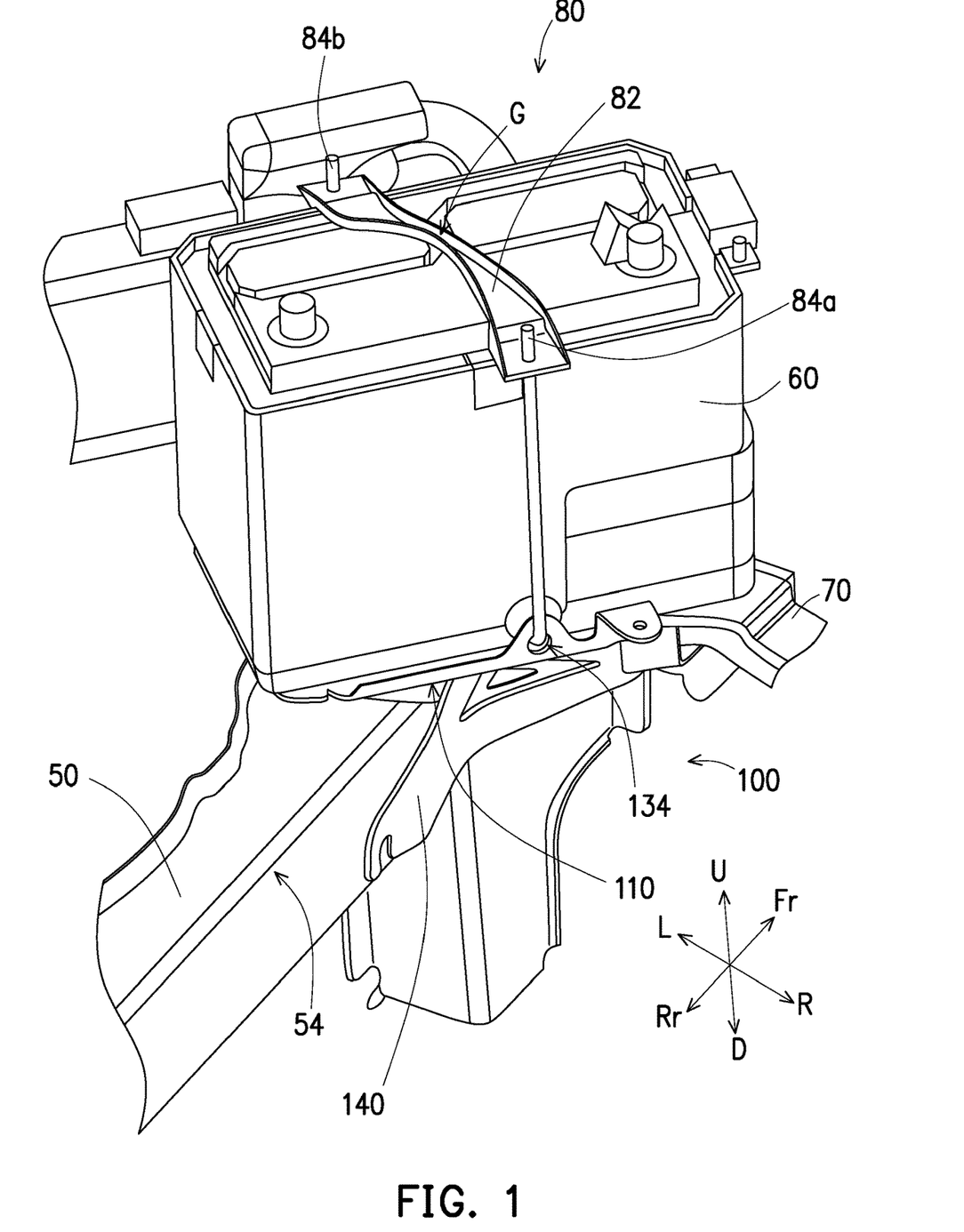
FIG. 1 is a schematic three-dimensional view of a battery installation structure installed with a battery and a wiring harness according to an embodiment of the disclosure.
Figure 2:
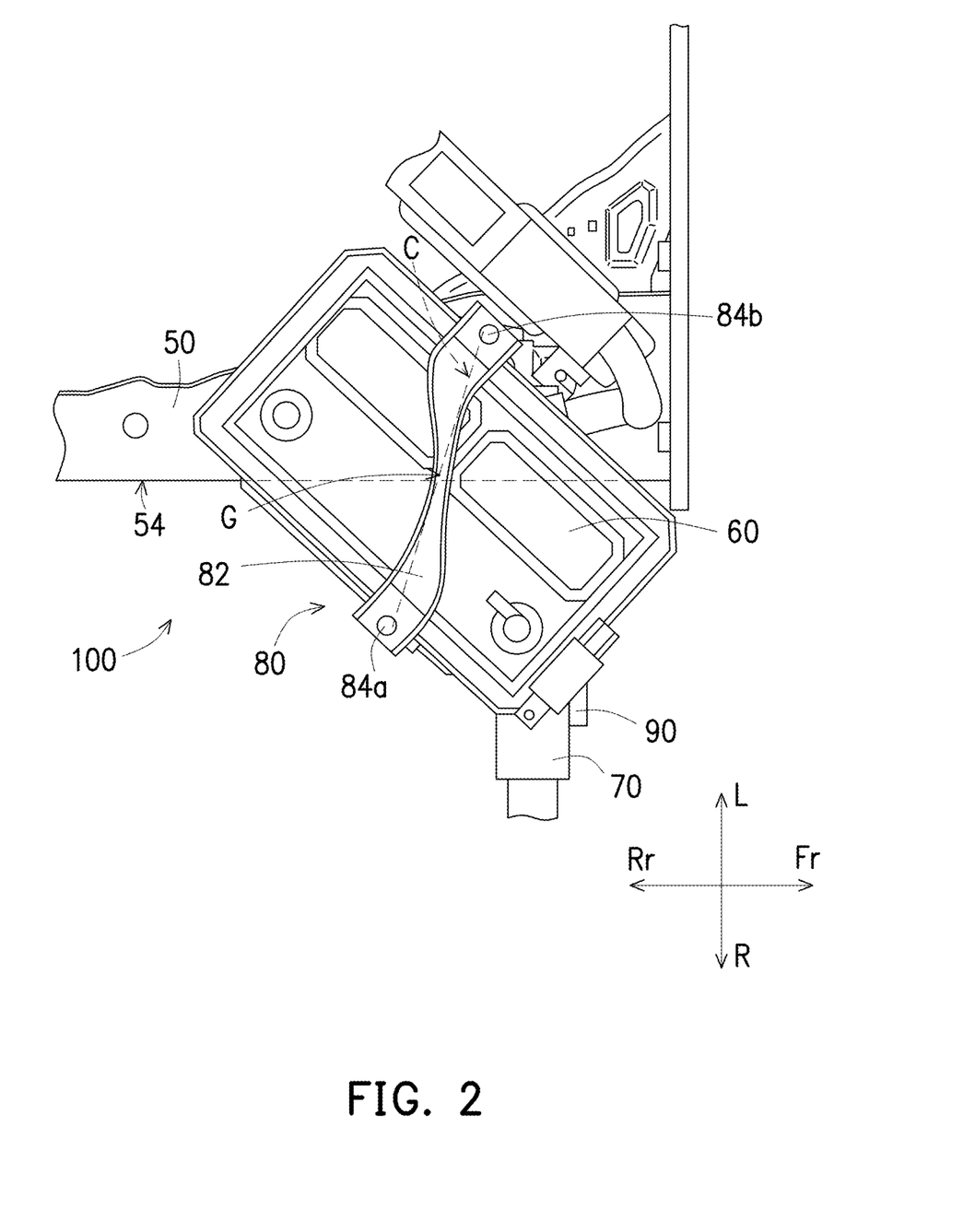
FIG. 2 is a schematic top view of the battery installation structure installed with the battery and the wiring harness shown in FIG. 1.
Figure 3:
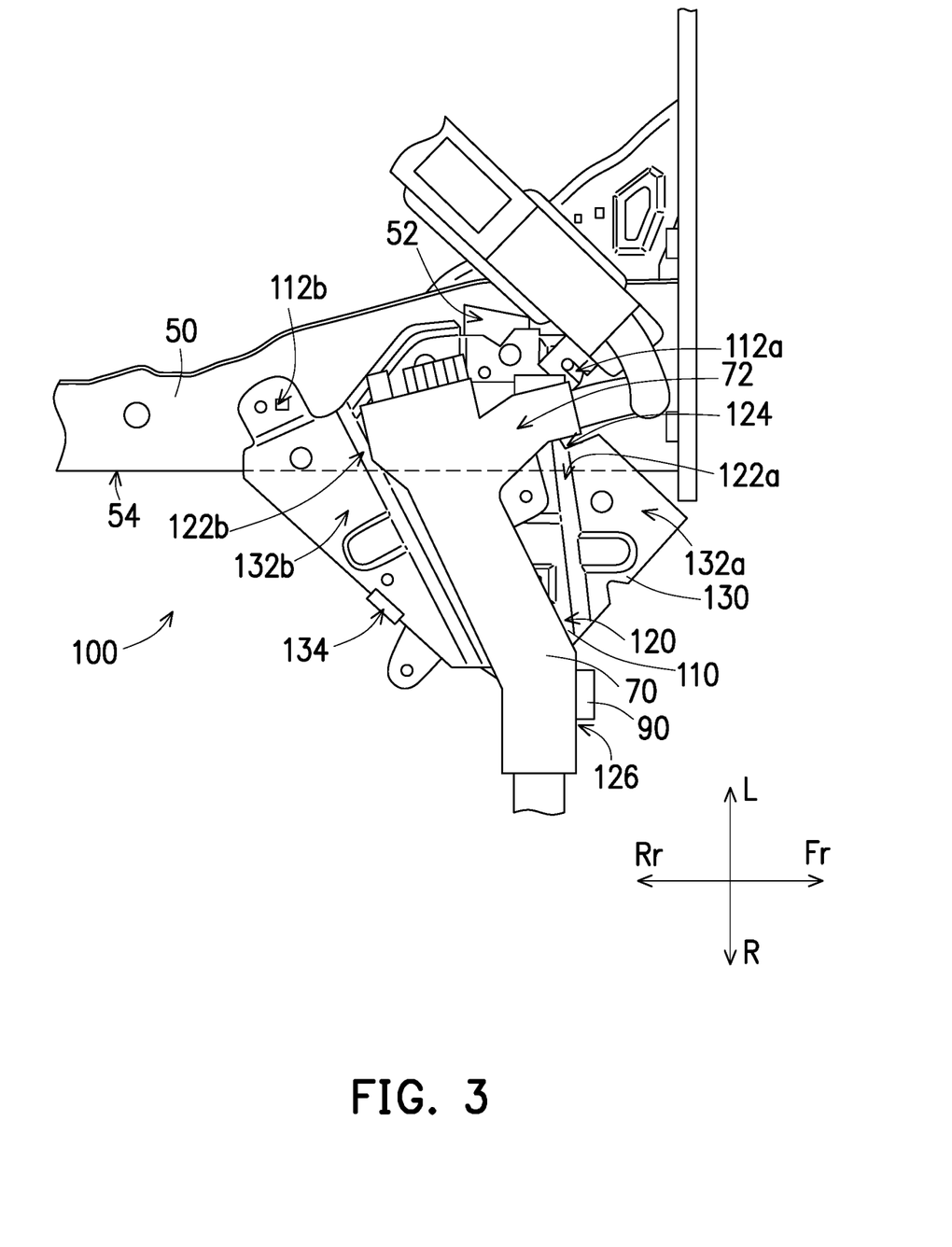
FIG. 3 is a schematic top view of the battery installation structure installed with the wiring harness shown in FIG. 1.
Figure 4:
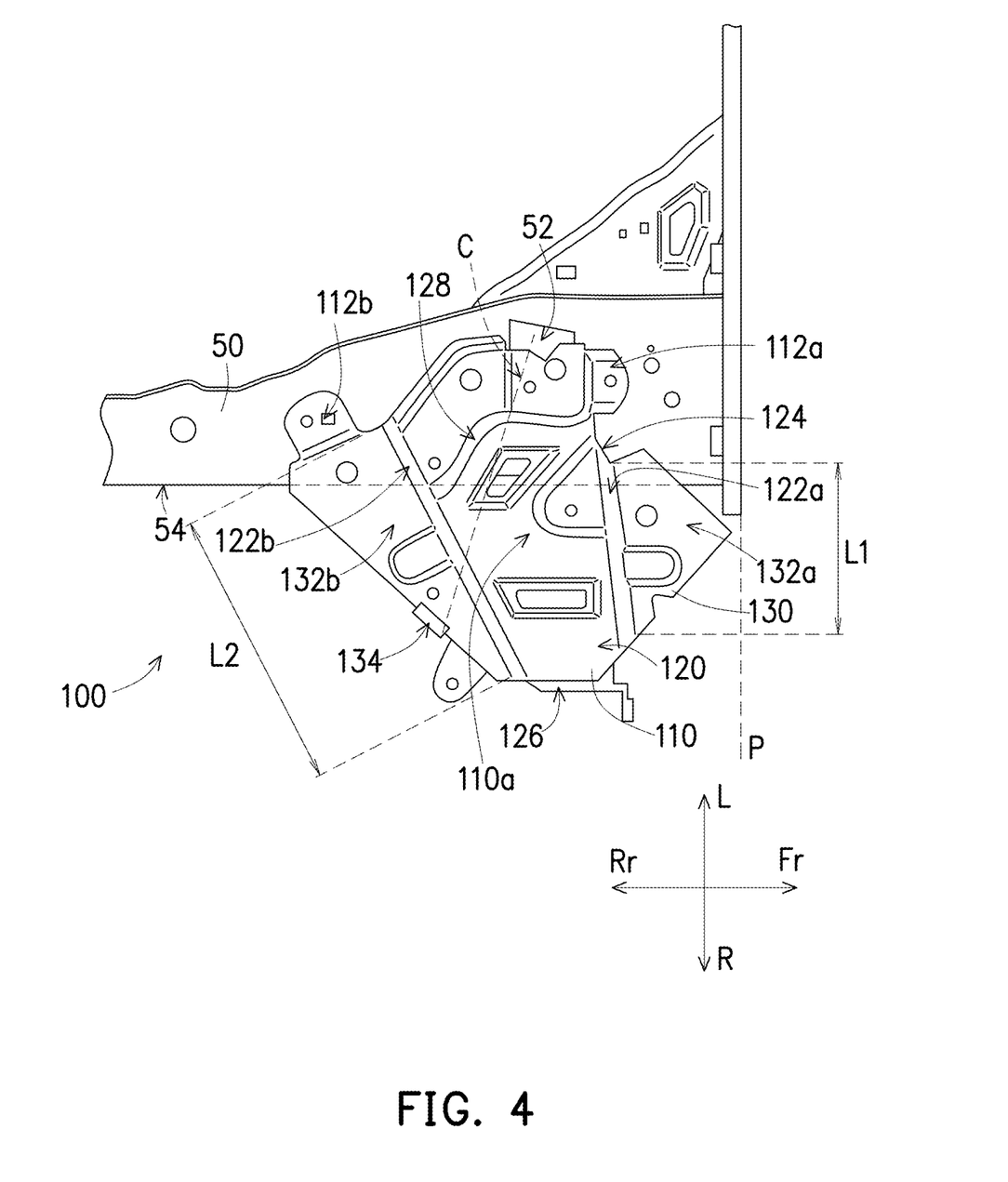
FIG. 4 is a schematic top view of the battery installation structure shown in FIG. 1.
Figure 5:
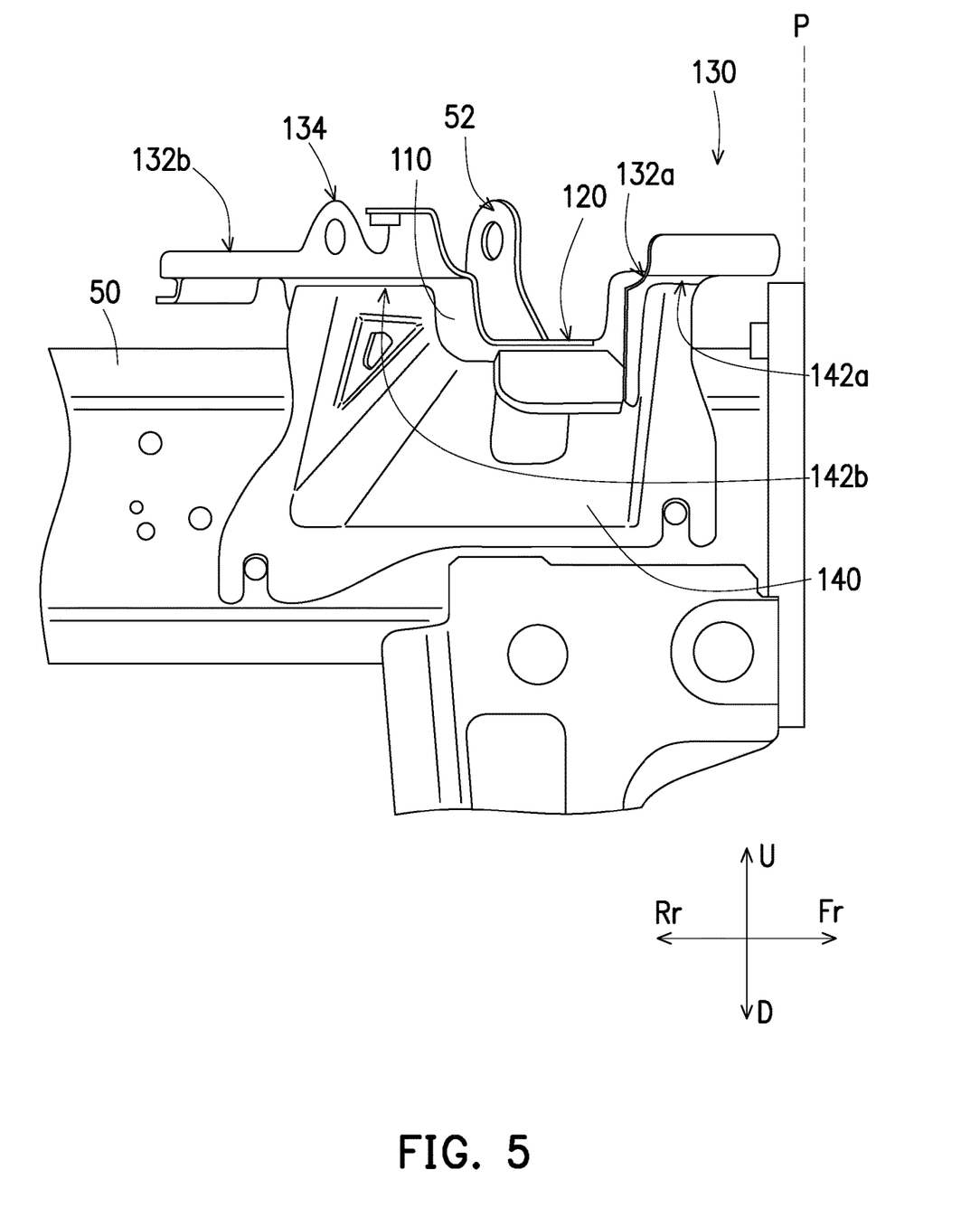
FIG. 5 is a schematic side view of the battery installation structure shown in FIG. 1.

Description of the disclosure is given with reference to the exemplary embodiments illustrated by the accompanying drawings. Herein, FIG. 1 is a schematic three-dimensional view of a battery installation structure installed with a battery and a wiring harness according to an embodiment of the disclosure. FIG. 2 is a schematic top view of the battery installation structure installed with the battery and the wiring harness shown in FIG. 1. FIG. 3 is a schematic top view of the battery installation structure installed with the wiring harness shown in FIG. 1. FIG. 4 is a schematic top view of the battery installation structure shown in FIG. 1. FIG. 5 is a schematic side view of the battery installation structure shown in FIG. 1. Hereinafter, the purpose, installation position, and specific structure of a battery installation structure 100 of this embodiment are be described together with FIG. 1 to FIG. 5. However, the battery installation structure 100 of this embodiment is only an example of the disclosure, and the disclosure is not limited thereto.

First, with reference to FIG. 1 to FIG. 5, in this embodiment, the battery installation structure 100 includes an installation base 110, a receiving groove 120, and a supporting portion 130. Herein, the installation base 110 is disposed on a front side frame 50 of a vehicle body (not shown). The receiving groove 120 is disposed in a middle 110a of the installation base 110 to receive a wiring harness 70 connected to a battery 60. The supporting portion 130 is disposed at a front end and a rear end of the installation base 110 and forms triangular supporting surfaces 132a and 132b at a front and rear of the receiving groove 120 to support the battery 60. That is, the installation base 110 is recessed in the middle 110a to form the receiving groove 120, so unrecessed parts such as the front end and the rear end (i.e., a vehicle front direction Fr and a vehicle rear direction Rr) of the installation base 110 correspondingly form the supporting surfaces 132a and 132b opposite to each other, and the receiving groove 120 is located between the two triangular supporting surfaces 132a and 132b forming the supporting portion 130. In this way, the battery installation structure 100 is suitable for allowing the battery 60 connected to the wiring harness 70 to be obliquely installed on the front side frame 50 of the vehicle body.

Herein, the front side frame 50 is a frame structure connected to a portion of the vehicle body, such as a vehicle body front structure (not shown) and extending in a vehicle front-and-rear direction (i.e., the vehicle front direction Fr and the vehicle rear direction Rr). The installation base 110 is disposed on the front side frame 50 and is installed above the front side frame 50 in a vehicle up-and-down direction (i.e., a vehicle up direction U and a vehicle down direction D), for example (as shown in FIG. 1 and FIG. 5). Thus, the battery 60 supported via the battery installation structure 100 is also disposed above the front side frame 50 of the vehicle body (as shown in FIG. 1). However, in the disclosure, the direction in which the battery installation structure 100 is disposed on the front side frame 50 is not limited, and it may be adjusted according to needs.

Further, the oblique installation means that the battery 60 does not extend in the vehicle front-and-rear direction (i.e., the vehicle front direction Fr and the vehicle rear direction Rr) nor in a vehicle left-and-right direction (i.e., a vehicle left direction L and a vehicle right direction R) with respect to the front side frame 50 extending in the vehicle front-and-rear direction, and thus is configured to be installed obliquely (as shown in FIG. 1 and FIG. 2). However, as long as the battery 60 is obliquely arranged with respect to the front side frame 50, the actual arrangement direction of the battery 60 is not limited in the disclosure, and it may be adjusted according to needs. Besides, the wiring harness refers to a power cord connected to the battery 60, but it is not limited thereto.

In thus can be seen that in this embodiment, the battery installation structure 100 is suitable for allowing the battery 60 connected to the wiring harness 70 to be obliquely installed on the front side frame 50 of the vehicle body. Herein, the installation base 110 of the battery installation structure 100 is installed on the front side frame 50 through installation portions 112a and 112b (as shown in FIG. 4), and the wiring harness 70 is received in the receiving groove 120 in the middle 110a of the installation base 110 (as shown in FIG. 3). Moreover, since the battery 60 is disposed on the installation base 110, the battery 60 is supported on the two triangular supporting surfaces 132a and 132b acting as the supporting portion 130 and formed at the front end and the rear end of the installation base 110 and shields the wiring harness 70 received in the receiving groove 120 (as shown in FIG. 1 and FIG. 2). Herein, the battery 60 may also be fixed on the installation base 110 through a fixing member 80, but the way of fixing is not limited in the disclosure, and it may be adjusted according to needs.

In this case, since the receiving groove 120 has a recessed structure, the wiring harness 70 received in the receiving groove 120 does not affect the battery 60 to contact the two triangular supporting surfaces 132a and 132b formed at the front and rear of the receiving groove 120. Besides, the two triangular supporting surfaces 132a and 132b acting as the supporting portion 130 at the front and rear of the receiving groove 120 may support the battery 60 from two opposite corners of the battery 60. Another corner between the two opposite corners of the battery 60 is correspondingly located above the front side frame 50. In this way, the battery 60 is supported by the supporting portion 130 formed as the triangular supporting surfaces 132a and 132b at the front and rear of the receiving groove 120. As such, the battery 60 may be obliquely installed on the front side frame 50 of the vehicle body while maintaining the stability, and flexibility of arrangement of the wiring harness 70 is also improved. Accordingly, the battery installation structure 100 may allow the battery 60 to be obliquely installed on the front side frame 50 while maintaining the stability of the battery 60.

Detailed description of the receiving groove 120 is provided as follows. In this embodiment, as shown in FIG. 3 and FIG. 4, the receiving groove 120 disposed in the middle 110a of the installation base 110 is configured to gradually widen towards a diverging direction of the wiring harness 70. To be specific, the wiring harness 70 has a diverging portion 72, and the diverging direction refers to a direction (e.g., the vehicle left direction L shown in FIG. 3 and FIG. 4) in which the wiring harness 70 is divided from one wiring harness into two or more harnesses through the diverging portion 72. In this way, the receiving groove 120 is configured to gradually widen towards the diverging direction (e.g., the vehicle left direction L) of the wiring harness 70, so that the receiving groove 120 may form a wide end portion corresponding to the diverging direction to receive the diverging portion 72 (as shown in FIG. 3) of the wiring harness 70, and the flexibility of arrangement of the wiring harness 70 is thereby improved. However, the above structure of the receiving groove 120 is not limited in the disclosure and may be adjusted according to needs.

Further, in this embodiment, as shown in FIG. 3 and FIG. 4, the two triangular supporting surfaces 132a and 132b acting as the supporting portion 130 are disposed in a direction opposite to the diverging direction of the wiring harness 70. To be specific, the diverging direction of the wiring harness 70 is, for example, the vehicle left direction L as shown in FIG. 3 and FIG. 4. In this way, the two triangular supporting surfaces 132a and 132b acting as the supporting portion 130, disposed at the front end and the rear end of the installation base 110, and formed at the front and rear of the receiving groove 120 are disposed at positions on the installation base 110 corresponding to the vehicle right direction R as shown in FIG. 3 and FIG. 4, for example. In this way, even if the receiving groove 120 with a wide end at one end is adopted, the two triangular supporting surfaces 132a and 132b acting as the supporting portion 130 may be secured, so that the functions of the receiving groove 120 and the supporting portion 130 may still be provided, and the flexibility of arrangement of the wiring harness 70 is thereby improved. However, the above structure of the receiving groove 120 is not limited in the disclosure and may be adjusted according to needs.

Besides, in this embodiment, as shown in FIG. 3 and FIG. 4, a length L1 of one side wall 122a of the receiving groove 120 is shorter than a length L2 of another side wall 122b of the receiving groove 120, and one end of the one side wall 122a is provided with a notch 124. To be specific, the receiving groove 120 formed by the recess in the middle 110a of the installation base 110 has the side walls 122a and 122b adjacent to the supporting surfaces 132a and 132b. Herein, the length L1 of the side wall 122a of the receiving groove 120 corresponding to the vehicle front direction Fr is shorter than the length L2 of another side wall 122b of the receiving groove 120 corresponding to the vehicle rear direction Rr, and the wider end (e.g., the end corresponding to the diverging direction of the wiring harness 70, i.e., the vehicle left direction L) of the receiving groove 120 is provided with the notch 124 (as shown in FIG. 4). In this way, the diverging portion 72 may extend outwards through the notch 124 and may diverge from extending in the vehicle left-and-right direction to extending in the vehicle front-and-rear direction, and the flexibility of arrangement of the wiring harness 70 is thereby improved. However, the above structure of the receiving groove 120 is not limited in the disclosure and may be adjusted according to needs.

In addition, in this embodiment, as shown in FIG. 3 to FIG. 5, an inner side of the receiving groove 120 is provided with an engaging piece 126 for being engaged with the wiring harness 70. To be specific, the diverging direction of the wiring harness 70 is, for example, the vehicle left direction L as shown in FIG. 3 and FIG. 4. Therefore, the wiring harness 70 diverges to an outer side of the front side frame 50, and the engaging piece 126 is arranged in a direction opposite to the diverging direction of the wiring harness 70, that is, an inner side (e.g., the vehicle right direction R shown in FIG. 3 and FIG. 4) of the front side frame 50. As such, the engaging piece 126 disposed at the inner side of the receiving groove 120 may be used to be engaged with the end of the wiring harness 70 opposite to the diverging portion 72, so that an additional clip 90 (shown in FIG. 3) may be inserted into the engaging piece 126 to fix the wiring harness 70 on the receiving groove 120. Therefore, even if the wiring harness 70 is obliquely arranged, interference between the wiring harness 70 with the side walls 122a and 122b of the receiving groove 120 may be suppressed, and the flexibility of arrangement of the wiring harness 70 is thereby improved. However, the above structure of the receiving groove 120 is not limited in the disclosure and may be adjusted according to needs.

Detailed description of the supporting portion 130 is provided as follows. In this embodiment, as shown in FIG. 4 and FIG. 5, a front end of the supporting portion 130 coincides with a front end of the front side frame 50 in a front-and-rear direction. To be specific, the two triangular supporting surfaces 132a and 132b acting as the supporting portion 130 and formed at the front and rear of the receiving groove 120 is a part of the installation base 110. The supporting surface 132a corresponds to the vehicle front direction Fr, and the supporting surface 132b corresponds to the vehicle rear direction Rr. In this case, preferably, the front end of the supporting portion 130, that is, the front end of the supporting surface 132a corresponding to the vehicle front direction Fr, is located at a position that coincides with the front end of the front side frame 50 in the front-and-rear direction, for example, the two are both approximately located on a position line P shown in FIG. 4 and FIG. 5. As such, the front end of the supporting portion 130 coincides with the front end of the front side frame 50 in the front-and-rear direction. That is, the installation base 110 on which the supporting portion 130 is formed is disposed near the front end of the front side frame 50, so that a space behind the supporting portion 130 may be increased, and the flexibility of arrangement of the wiring harness 70 is thereby improved. However, the abovementioned arrangement of the supporting portion 130 is not particularly limited in the disclosure, and the arrangement may be adjusted according to needs.

Detailed description of a fixing structure of the battery installation structure 100 is provided as follows. In this embodiment, as shown in FIG. 4 and FIG. 5, a pair of fixing portions (i.e., a fixing portion 134 and a fixing portion 52) are correspondingly provided on the supporting surface 132b of the supporting portion 130 protruding from the front side frame 50 towards the inner side and on the front side frame 50. To be specific, the obliquely arranged battery 60 is installed on the front side frame 50 through the battery installation structure 100. One part of the battery installation structure 100 protrudes from the inner side of the front side frame 50, and the other part is located on the front side frame 50. As such, the battery 60 installed on the front side frame 50 through the battery installation structure 100 is also configured to allow one part thereof to protrude from the inner side of the front side frame 50 and the other part to be located on the front side frame 50. In this case, the supporting surface 132b of the supporting portion 130 protruding from the front side frame 50 towards the inner side is correspondingly provided with the fixing portion 134, and the front side frame 50 is correspondingly provided with the fixing portion 52. As such, the fixing portion 134 located at the inner side of the front side frame 50 and the fixing portion 52 located on the front side frame 50 are arranged in opposite directions, so that the battery 60 may be fixed from opposite sides of the battery 60.

Further, in this embodiment, as shown in FIG. 1 and FIG. 2, in the case where the battery 60 is installed on the front side frame 50 through the battery installation structure 100, the battery 60 may be fixed on the battery installation structure 100 from opposite sides of the battery 60 through the fixing member 80. Herein, the fixing member 80 is, for example, a plate body 82 pressing the battery 60 and a pair of inserted rods 84a and 84b respectively connected to opposite ends of the plate body 82 and the pair of fixing portions 134 and 52. In this way, the fixing member 80 is connected to the pair of fixing portions 134 and 52 arranged in opposite directions to fix the battery 60. Moreover, the battery 60 is not only connected to the battery installation structure 100 through the fixing portion 134 but is also connected to the front side frame 50 through the fixing portion 52. Therefore, even if the obliquely installed battery 60 is configured to allow one part thereof to protrude from the inner side of the front side frame 50, the battery 60 may be pulled by the fixing member 80 and the pair of fixing portions 134 and 52 towards the front side frame 50 and thus may be stably fixed on the battery installation structure 100.

Preferably, in this embodiment, as shown in FIG. 1 and FIG. 2, a center of gravity G of the battery 60 installed on the installation base 110 is arranged on a ridge line 54 of the front side frame 50 in a plan view (e.g., the plane as shown in the schematic top view of FIG. 2). Further, the center of gravity G of the battery 60 corresponds to the fixing member 80 connected to the pair of fixing portions 134 and 52 in a plan view. To be specific, the obliquely installed battery 60 is configured to allow one part thereof to protrude from the inner side of the front side frame 50 and another part thereof to be located on the front side frame 50. In this way, the center of gravity G of the battery 60 installed on the installation base 110 is arranged on the ridge line 54 of the front side frame 50 in a plan view. That is, the part of the battery 60 protruding from the inner side of the front side frame 50 does not include the center of gravity G, so a weight of the battery 60 may be supported by the battery installation structure 100 and the front side frame 50. Further, the center of gravity G of the battery 60 corresponds to the fixing member 80 connected to the pair of fixing portions 134 and 52 in a plan view. That is, a connecting line C of the pair of fixing portions 134 and 52 generally passes through the center of gravity G of the battery 60 in a plan view. As such, a fixing force brought by the fixing member 80 and the pair of fixing portions 134 and 52 passes through the center of gravity G of the battery 60 and may then effectively pull the part of the battery 60 protruding from the inner side of the front side frame 50. As such, the battery 60 may be obliquely installed on the front side frame 50 of the vehicle body while maintaining the stability. However, the abovementioned arrangement of the battery installation structure 100 is not particularly limited in the disclosure, and the arrangement may be adjusted according to needs.

Detailed description of a reinforcing structure of the battery installation structure 100 is provided as follows. In this embodiment, as shown in FIG. 4, a reinforcing rib 128 is provided in the receiving groove 120 along the connecting line C of the pair of fixing portions 134 and 52. To be specific, the fixing member 80 is connected to the pair of fixing portions 134 and 52 to fix the obliquely disposed battery 60. As such, in the battery installation structure 100, a position corresponding to the connecting line C of the pair of fixing portions 134 and 52 is a position where the fixing force brought by the fixing member 80 and the pair of fixing portions 134 and 52 is applied. Here, in the receiving groove 120 that is formed as a recess and thus has a low strength, the reinforcing rib 128 is provided along the connecting line C of the pair of fixing portions 134 and 52, so that the strength of the receiving groove 120 may be improved. In this way, even if the fixing force is applied by connecting the pair of fixing portions 134 and 52 through the fixing member 80, deformation of the receiving groove 120 may be suppressed. As such, the wiring harness 70 received in the receiving groove 120 is protected, and the flexibility of arrangement of the wiring harness 70 is improved. However, the abovementioned arrangement of the battery installation structure 100 is not particularly limited in the disclosure, and the arrangement may be adjusted according to needs.

In addition, in this embodiment, as shown in FIG. 1 and FIG. 5, a lower member 140 extending from the inner side of the front side frame 50 to the supporting portion 130 is provided below the installation base 110, and the lower member 140 is provided with reinforcing surfaces 142a and 142b supporting the supporting surfaces 132a and 132b. To be specific, one part of the battery installation structure 100 protrudes from the inner side of the front side frame 50, so an insufficient supporting force may thereby be provided. Here, the lower member 140 extending from the inner side of the front side frame 50 to the supporting portion 130 is provided below the installation base 110 (i.e., the vehicle down direction D). That is, the lower member 140 is configured as a member extending in the vehicle up direction U, and further, the reinforcing surfaces 142a and 142b (as shown in FIG. 5) are provided at a top end of the lower member 140 to support the supporting surfaces 132a and 132b. As such, the lower member 140 may reinforce the supporting force brought by the supporting portion 130 from below the installation base 110. The weight of the battery 60 applied on the installation base 110 is then further distributed to the front side frame 50, so that even if the battery 60 vibrates, the deformation of the supporting portion 130 may be suppressed. However, the abovementioned arrangement of the battery installation structure 100 is not particularly limited in the disclosure, and the arrangement may be adjusted according to needs.

In view of the foregoing, in the battery installation structure provided by the disclosure, the installation base is disposed on the front side frame. The receiving groove is disposed in the middle of the installation base to receive the wiring harness connected to the battery. The supporting portion is disposed at the front end and the rear end of the installation base and forms the triangular supporting surfaces at the front and rear of the receiving groove to support the battery. In this way, the battery is supported by the triangular supporting surfaces at the front and rear of the receiving groove. As such, the battery may be obliquely installed on the front side frame of the vehicle body while maintaining the stability, and the flexibility of arrangement of the wiring harness is also improved. Preferably, the pair of fixing portions are correspondingly disposed on the supporting portion and the front side frame. The center of gravity of the battery installed on the installation base is arranged on the ridge line of the front side frame in a plan view. Further, the center of gravity of the battery corresponds to the fixing member connected to the pair of fixing portions in a plan view, and the stability of the battery is thereby improved. Therefore, the battery installation structure provided by the disclosure is capable of allowing the battery to be obliquely installed on the front side frame while maintaining the stability of the battery.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A battery installation structure, comprising:
an installation base, disposed on a front side frame of a vehicle body,
a receiving groove, disposed in a middle of the installation base and formed by a recessed part of the installation base, so as to receive a wiring harness connected to a battery; and
a supporting portion, disposed at a front end and a rear end of the installation base, and forming triangular supporting surfaces by unrecessed parts of the installation base at a front and rear of the receiving groove to support the battery, wherein
the receiving groove is located between the triangular supporting surfaces forming the supporting portion.

2. The battery installation structure according to claim 1, wherein the receiving groove is configured to gradually widen towards a diverging direction of the wiring harness.

3. The battery installation structure according to claim 1, wherein a front end of the supporting portion is disposed near a front end of the front side frame in a front-and-rear direction.

4. The battery installation structure according to claim 1, wherein the triangular supporting surfaces are arranged in a direction opposite to a diverging direction of the wiring harness.

5. The battery installation structure according to claim 1, wherein a length of one side wall of the receiving groove is shorter than a length of another side wall of the receiving groove, and one end of the one side wall is provided with a notch.

6. The battery installation structure according to claim 1, wherein one fixing portion among a pair of fixing portions are correspondingly is provided on the triangular supporting surface of the supporting portion protruding from the front side frame towards an inner side, and another fixing portion among the pair of fixing portions is provided on the front side frame.

7. The battery installation structure according to claim 6, wherein a center of gravity of the battery installed on the installation base is arranged on a ridge line of the front side frame in a plan view, and a fixing member connected to the pair of fixing portions passes through the center of gravity of the battery in the plan view.

8. The battery installation structure according to claim 6, wherein a reinforcing rib is provided in the receiving groove along a connecting line of the pair of fixing portions.

9. The battery installation structure according to claim 1, wherein an inner side of the receiving groove is provided with an engaging piece for being engaged with the wiring harness.

10. The battery installation structure according to claim 1, wherein a lower member extending from an inner side of the front side frame to the supporting portion is provided below the installation base, and the lower member is provided with reinforcing surfaces supporting the triangular supporting surfaces.

* * * * *